United States Patent [19]
Koehler

[11] Patent Number: 5,878,363
[45] Date of Patent: Mar. 2, 1999

[54] CONTROL TO IMPROVE DUMP WHILE LIFTING

[75] Inventor: Douglas W. Koehler, Naperville, Ill.

[73] Assignee: Caterpillar Inc., Peoria, Ill.

[21] Appl. No.: 684,531

[22] Filed: Jul. 19, 1996

[51] Int. Cl.[6] .................................................. F15B 13/16
[52] U.S. Cl. ................................ 701/50; 701/1; 91/361; 60/327
[58] Field of Search ........................... 701/1, 50; 91/361, 91/435, 459, 461; 60/327, 426, 427; 172/2, 7, 4.5, 9

[56] References Cited

U.S. PATENT DOCUMENTS

| | | | |
|---|---|---|---|
| 5,490,384 | 2/1996 | Lunzman | 60/327 |
| 5,528,843 | 6/1996 | Rocke | 37/348 |
| 5,617,723 | 4/1997 | Hosseini et al. | 60/327 |
| 5,678,470 | 10/1997 | Koehler et al. | 91/516 |
| 5,701,793 | 12/1997 | Gardner et al. | 91/361 |
| 5,737,993 | 4/1998 | Cobo et al. | 91/361 |

*Primary Examiner*—Tan Q. Nguyen
*Attorney, Agent, or Firm*—Calvin E. Glastetter

[57] ABSTRACT

A control system is typically used for controlling the implements of a machine. The control system includes a operator control section and a electronic control section having a module for sensing a pair of control signals from the operator control section. When a lift signal and a dump signal is sensed the module will modify the electronic control section in response to the sensed signals.

3 Claims, 1 Drawing Sheet

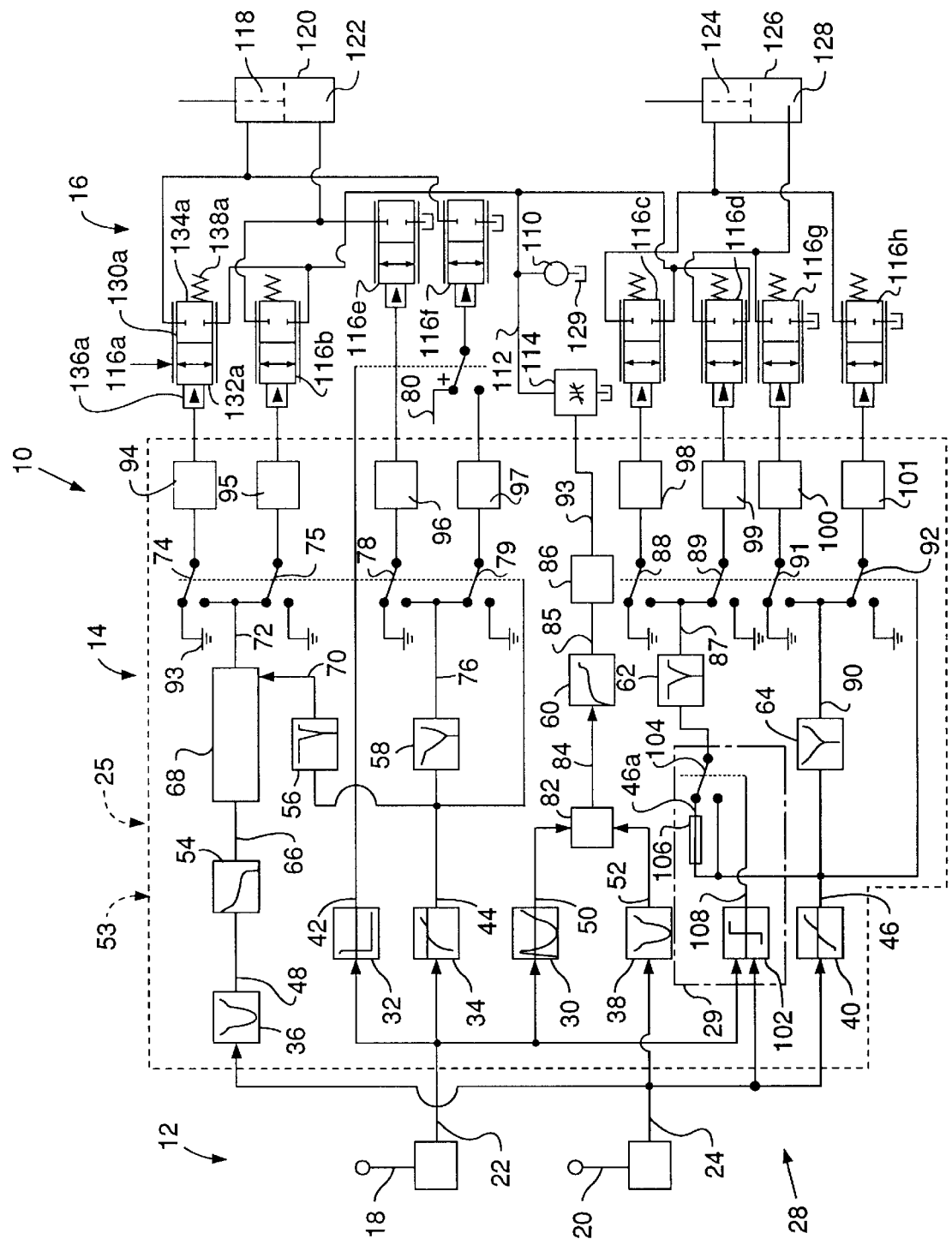

CONTROL TO IMPROVE DUMP WHILE LIFTING

DESCRIPTION

1. Technical Field

This invention relates to a control system for the implements of a machine and more particularly to a control system that alters the commands to the tilt valve when lift is commanded.

2. Background Art

A control system typically used to control the implement, such as a bucket, of a machine uses series bypass to control the relative flow between the lift and the tilt circuits of the implement. A problem could occur when lift and tilt are commanded together. When lift is actuated system pressure increases and this increased pressure is also available to the tilt circuit. Since only low pressure is required to dump the bucket the tilt actuator moves quickly and the flow is diverted from the lift actuator. As a result the velocity in dump is different with the lift actuated than without the lift actuated which can affect lift velocity and cavitate the cylinders.

The present invention is directed to overcoming one or more of the problems as set forth above.

DISCLOSURE OF THE INVENTION

In one aspect of the present invention, a control system for operating the implements of a machine is provided. The control system includes an operator input section and an electronic section. The control system comprises a first control signal indicating a lift. A second control signal indicates a dump. A modulation module senses the first and second control signals and modifies the electronic control section in response to the sensed signals.

In another aspect of the present invention, a method of improving dump while lifting in a control system having an operator control section and an electronic control section comprising the steps of sensing a first control signal from the operator control section indicating a lift, sensing a second control signal from the operator control section indicating a dump, modifying the electronic control section in response to the sensed first and second control signals.

BRIEF DESCRIPTION OF THE DRAWINGS

The sole FIGURE is a diagrammatic flow chart and hydraulic system of the present invention.

BEST MODE FOR CARRYING OUT THE INVENTION

A control system 10 is shown for controlling the implements of a machine, for example the bucket of a wheel loader, (not shown). The control system 10 includes an operator input control section 12, an electronic control section 14 and a hydraulic control section 16.

The operator input control section 12 includes a first implement lever 18 for lifting and lowering the implement of the machine and a second implement lever 20 for controlling the rackback and dump of the implement. The movement of the first implement lever 18 produces an electrical control signal 22 which is sent to the electronic control section 14. The movement of the second implement lever 20 produces an electrical control signal 24 which is also sent to the electronic control section 14. The control signals 22, 24 are positive when the implement levers 18, 20 are moved to lift and rackback the implement. The control signals 22, 24 are negative when the implement levers 18,20 are moved to lower or dump the implement.

The electronic control section 14 can be in the form of a microprocessor 25 or any other suitable system for controlling the hydraulic control section 16. The electronic control section 14 includes a lift/lower circuit 26, a tilt/dump circuit 28 and a logic module 29 which receives both input commands 22,24. The control signal 22 from the first lever 18 is sent to a pressure map 30, a float logic map 32 and a modulation map 34 within the lift circuit 26. The control signal 24 from the second control lever 20 is sent to a pressure map 36, a pressure map 38 and a modulation map 40 within the tilt circuit 28. The maps 30–40 convert the operator input signals 22, 24 into two separate requirements, such as one requirement being a plurality of desired implement velocity signals 42, 44 and 46. The second requirement being a plurality of desired pressure signals 48, 50 and 52. The maps 30–40 are in the form of lookup tables which receive the operator input signals 22, 24 and converts them into the desired implement velocity or pump pressure and sends the signals to a second plurality of maps 53.

The second plurality of maps 53 determine what needs to be actuated in order to meet the desired requirements. The second plurality of maps 53 includes a combination of pressure and flow modulation maps 54–64. Pressure map 54 receives the input signal 48 and determines what command is necessary and sends a signal 66 to a limiter module 68. Flow modulation maps 56,58 receive the input signal 44. Map 56 sends a signal 70 to the limiter module 68. The limiter module 68 combines the signals 66,70 and sends a signal 72 to a switch 74 and a switch 75. Map 58 sends a signal 76 to a switch 78 and a switch 79. Signal 44 is also used to control the position of the switches 74,75,78 and 79. Signal 42 is used to control the position of a float control switch 80. Pressure signals 50,52 are sent to a selector module 82 which selects the larger of the two signals 50,52 and sends a selected signal 84 to the map 60. Map 60 sends a signal 85 to an actuator 86. Flow modulation maps 62 receives a signal from the logic module 29. Flow modulation map 64 receive the input signal 46. Map 62 sends a signal 87 to a switch 88 and a switch 89. Map 64 sends a signal 90 to a switch 91 and a switch 92. Signal 46 is also used to control the position of the switches 88,89,91 and 92. The switches are constructed so that when a positive signal is received switches 75,79,89 and 92 are connected to the respective signal and the other switches 74,78,88 and 91 are connected to a ground 93.

When a negative signal is received the switch connections are reversed. Switches 74,75,78,79,88, 89,91, and 92 are connectable to a respective actuator 94,95,96,97,98,99,100, and 101.

The modulation module 29 includes a map 102 which receives the input signal 22 and the input signal 24. The module 29 also includes a switch 104 and a gain block 106 which modifies the input signal 46 a predetermined amount when both lift and dump are commanded and a modified signal 46a is sent to the map 62. Signal modification depends only on the sign of the signal coming from the control levers 18,20. The map 102 outputs a signal 108 for controlling the switch 104. When the map 102 receives both a positive lift command 22 and a negative dump command 24 the signal 108 moves the switch 104 to the position shown, whereby the modified signal 46a is sent to the map 62. When the map 102 does not receive both a lift command and a dump command the signal 108 moves the switch 104 to connect the signal 46 to the map 62.

The hydraulic control section 16 includes a supply pump 110. A line 112 connects the supply pump 110 to a bypass valve 114. A signal 93 from the actuator 86 is connected to the bypass valve 114 for controlling the pressure within the hydraulic control section 16. The line 112 also connects the supply pump 110 to a plurality of independently operable solenoid displacement controlled flow metering spool valves 116a,116b, 116c and 116d. The valve 116a is connected to a rod end chamber 118 of a hydraulic actuator 120 and the valve 116b is connected to a head end chamber 122 of the hydraulic lift actuator 120. The valve 116c is connected to a rod end chamber 124 of a hydraulic tilt actuator 126 and the valve 116d is connected to a head end chamber 128 of the hydraulic actuator 126. Another plurality of independently operable solenoid displacement controlled flow metering spool valves 116e,116f,116g and 116h are disposed between the hydraulic actuators 120,126 and a tank 129. The valve 116e is connected to the head end chamber 122 and the valve 116f is connected to the rod end chamber 118 of the hydraulic actuator 120. The valve 116g is connected to the head end chamber 128 and the valve 116h is connected to the rod end chamber 124 of the hydraulic actuator 126. The spool valves 116a,116b,116c,116d control pump-to-cylinder fluid flow to the actuating chambers and the spool valves 116e,116f,116g,116h control cylinder-to-tank fluid flow from the actuating chambers to the tank. Each of the spool valves 116a,116b,116c,116d,116e,116g,116h are connected to the respective actuator 94,95,96,97,98,99,100,101. The spool valve 116f is connectable to the actuator 97 by the float switch 80. The valves 116a,116b,116e,116f are controlled to extend the hydraulic actuator 120 for lifting the implement and to retract the actuator 120 for lowering the implement. The valves 116c,116d,116g,116h are controlled to retract the hydraulic actuator 126 for rackback of the implement and to extend the actuator 126 for dumping the implement.

Each of the spool valves 116a,116b,116c,116d,116e,116f, 116g,116h are substantially identical with only spool valve 116a being described in detail with common reference numerals applied to the elements of all of the spool valves followed by the appropriate letter. Each of the spool valves includes a solenoid actuated valve spool 130a having opposite ends 132a,134a. A solenoid 136a disposed on the end 132a is connected to the respective actuator such as 94. A spring 138a is disposed at the end 134a opposite the solenoid 136a. The spring 138a normally biases the valve spool 130a to a neutral or non-energized position. The spool valves are shown as being in their neutral positions occupied when the control levers 18,20 are in the centered position.

INDUSTRIAL APPLICABILITY

In the use of the present invention, the electronic section 14 of the control system 10 defines the movement necessary in the hydraulic section 16 for controlling the implement of a machine. The electronic section 14 includes the lift/lower circuit 26, the rackback/dump circuit 28 and the modulation module 29. The gain block 106 in the modulation module 29 modifies the signal 46.

To lift the implement the control lever 18 is moved and the signal 22 is sent to the lift circuit 26 of the electronic section 14. To dump the implement the control lever 20 is moved and the signal 24 is sent to the dump circuit 28 of the electronic section 14. Both signals 22,24 are sent to the modulation map 102 in the modulation module 29. If the modulation map 102 receives both a lift command and a dump command the signal 108 will move the switch 104 to the first position. With the switch in the first position the modified signal 46a is connected to the electronic section 14. The modified signal 46a will control the dump circuit 28 to maintain the dump charteristics that are present when only a dump is commanded. If the modulation map 102 receives only one command or other combinations the switch is moved to the second position wherein the unmodified signal 46 is connected to the tilt circuit.

In view of the above, it is readily apparent that the control system will modify the tilt circuit when a lift command and a dump command are both received. The modified signal will maintain the consistent lift velocity and prevent actuator cylinder cavitation.

Other aspects, objects and advantages of this invention can be obtained from a study of the drawing, the disclosure and the appended claims.

I claim:

1. A control system for improving dump characteristics while lifting an implement of a machine, the control system includes an operator input section and an electronic control section having a lift circuit and a dump circuit, comprising:

a first control signal indicating a lift command;

a second control signal indicating a dump command;

a modulation module in the electronic control section sensing the first and second control signal and modifying the dump circuit in the electronic control section in response to the sensed signals;

a modulation map in the modulation module which receives the first and second control signals;

a gain block in the modulation module which modifies a signals within the dump circuit in response to the sensed first and second control signals; and a switch in the modulation module having a first position wherein the modified signal is connected to the dump circuit and a second position wherein the unmodified signal is connected to the dump circuit.

2. The control system of claim 1 wherein the modulation map controls the position of the switch in response to the sensed first and second control signals.

3. A method of improving the dump while lifting in a control system having an operator control section and an electronic control section, the method comprising the steps of:

sensing a first signal from the operator control section indicating a lift;

sensing a second signal from the operator control section indicating a dump;

modifying the electronic control section in response to the sensed first and second signals; and switching between a first position wherein a modified signal in the electronic control section is connected to the dump circuit and second position wherein a unmodified signal is connected to the dump circuit in response to the sensed first and second signals.

* * * * *